June 15, 1965  E. STEFFEN  3,189,116
LEVELING MECHANISM FOR ENDLESS TRACK TYPE VEHICLES
Filed Feb. 11, 1963
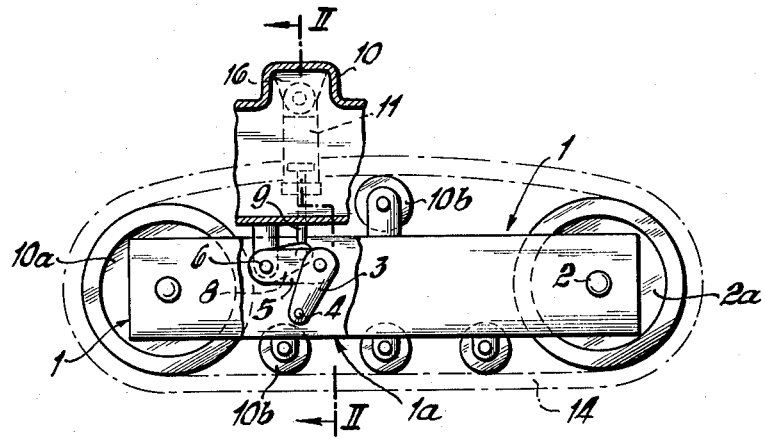
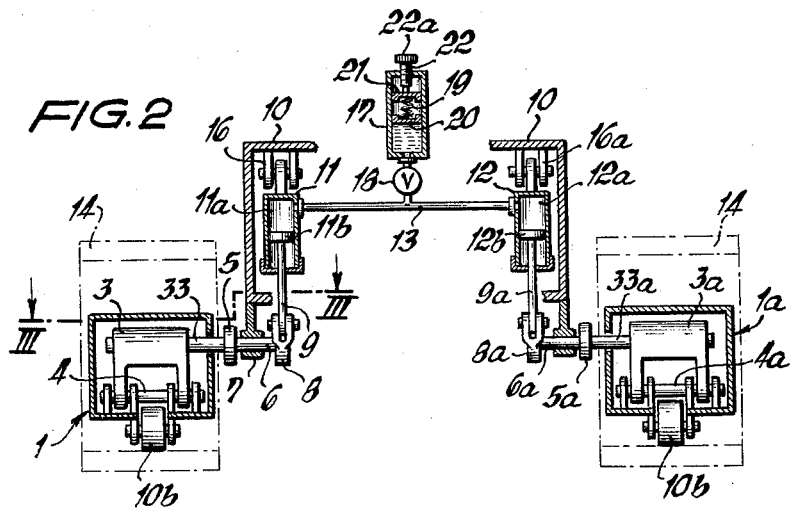
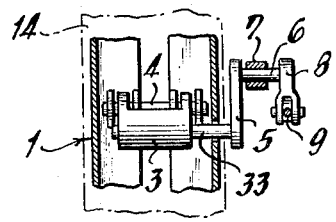

United States Patent Office 3,189,116
Patented June 15, 1965

3,189,116
LEVELING MECHANISM FOR ENDLESS
TRACK TYPE VEHICLES
Egon Steffen, Huttersdorf uber Lebach, Saar, Germany, assignor to Saarbergtechnik G.m.b.H., Saarwellingen, Saar, Germany
Filed Feb. 11, 1963, Ser. No. 257,527
6 Claims. (Cl. 180—9.5)

This invention relates to land vehicles, and more particularly to a leveling mechanism for vehicles having endless ground-engaging tracks.

In the type of vehicle under consideration, a driven axle is commonly mounted adjacent the rear of the chassis of the vehicle and fixed to such axle are a pair of rollers over which are trained the rear ends of the tracks of the vehicle. A pair of frames are pivotally mounted adjacent their rear ends on the axle, and such frames extend forwardly of the chassis of the vehicle on each side thereof. Adjacent the forward ends of the frames are rotatably mounted idler rollers which serve to receive the forward ends of the tracks of the vehicle. As the vehicle moves over the ground, the forward ends of the frames will tend to move vertically, depending upon the contour of the terrain over which the vehicle is moving.

Various means have heretofore been provided for controlling the vertical movement of the forward ends of the track-supporting frame in order to maintain the chassis level about the longitudinal axis, regardless of the nature of the terrain, and such means have included a cross-spring arrangement pivotally mounted on the chassis for movement about a longitudinal axis, and with the opposite ends engaging the frames on opposite sides of the chassis to support the same thereon. This spring arrangement is comparatively satisfactory when utilized on a vehicle in which the load on the chassis remain substantially constant, but in the case of a vehicle such as a bulldozer in which a ground-engaging blade is raised and lowered, the load on the chassis is suddenly changed, thereby radically varying the effect of the spring means with the result that maintaining proper adjustment of the blade with respect to the ground is extremely difficult.

It is accordingly an object of the invention to provide a levelling mechanism for vehicles having endless tracks which will operate to maintain the chassis of the vehicle substantially level about a longitudinal axis, regardless of the contour of the terrain over which the vehicle is travelling.

A further object of the invention is the provision of a levelling mechanism for vehicles having endless tracks which serves to maintain the chassis of the vehicle substantially level about a longitudinal axis, regardless of the terrain over which the vehicle is travelling, and also regardless of a variation in load on such chassis.

A still further object of the invention is the provision of a levelling mechanism for endless track vehicles, such mechanism providing for rigid support of the chassis of the vehicle on the ground-engaging tracks, but permitting relative vertical movement of one track with respect to the other while maintaining the chassis substantially level about a horizontal axis.

Another object of the invention is the provision of a levelling mechanism for endless track vehicles, including a pair of hydraulic cylinders, one cylinder being connected to each track of the vehicle and to the chassis thereof, and a conduit connecting such cylinders, whereby upon vertical movement of one track with respect to the other fluid will flow from one cylinder to the other to provide a rigid support for the chassis on the ground-engaging tracks, while maintaining such chassis substantially level about a longitudinal axis.

A further object of the invention is the provision of a levelling mechanism for vehicles having endless tracks, such mechanism including a pair of hydraulic cylinders, one cylinder being connected to each ground-engaging track and to the chassis of the vehicle, there being a conduit connecting the cylinders and an expansible chamber connected to the conduit and provided with a valve to render the chamber operative or inoperative, such chamber being operative to provide a resilient support for the chassis on the ground-engaging tracks.

A still further object of the invention is the provision of a levelling mechanism for vehicles having endless tracks, such mechanism including a pair of hydraulic cylinders, one cylinder being connected to each ground-engaging track and to the chassis of the vehicle, there being a conduit connecting the cylinders and an expansible chamber connected to the conduit, the expansible chamber comprising a cylinder with a piston therein, and adjustable spring means engaging the piston to control the operation thereof for various loads on the chassis of the vehicle.

Further objects and advantages of the invention will be apparent from the following description taken in conjunction with the accompanying drawing, wherein:

FIG. 1 is a side elevational view of the running gear of a vehicle of the endless track type, and with a portion of the chassis of such vehicle shown in section;

FIG. 2 is a sectional view taken substantially on the line II—II of FIG. 1; and

FIG. 3 is a fragmentary sectional view taken substantially on the line III—III of FIG. 2.

With continued reference to the drawing, there is shown the running gear of an endless track type vehicle in which a driven axle 2 is rotatably mounted on the chassis of the vehicle adjacent the rear end, a portion of the chassis being shown at 10. Pivotally mounted adjacent their rear ends on the axle 2 and extending forwardly on each side of the chassis 10 are a pair of frames 1 and 1a, and rotatably mounted on the frames 1 and 1a adjacent the forward ends thereof are idler rollers 10a. Driven rollers 2a are fixed on the axle 2, and ground-engaging tracks 14 are trained over the rollers 2a and 10a. The tracks 14 may be additionally supported between the rollers 2a and 10a by idler rollers 10b.

A link 3 is pivotally mounted at 4 on frame 1 forwardly of the axle 2, and the opposite end of the link 3 is pivotally connected to a crank arm 5 fixed to a crankshaft 6 rotatably mounted in a bearing 7 on the chassis 10. A hydraulic cylinder 11 is pivotally mounted on a bearing 16 on the chassis 10, and a piston 11b is slidably received in the chamber 11a of the cylinder 11. The piston 11b is provided with a piston rod 9 pivotally connected to a second crank arm 8 fixed to the crankshaft 6.

In a similar manner, a second link 3a is pivotally connected at 4a to the frame 1a forwardly of the axle 2, and the opposite end of the link 3a is pivotally connected to a crank arm 5a fixed to a second crankshaft 6a. A second hydraulic cylinder 12 is pivotally mounted at 16a on the chassis 10, and slidably received in the chamber 12a of the cylinder 12 is a piston 12b. The piston 12b is provided with a piston rod 9a which is pivotally connected to a second crank arm 8a fixed to the second crankshaft 6a. The chambers 11a and 12a of the cylinders 11 and 12, respectively, are filled with a suitable hydraulic fluid, and the chambers 11a and 12a are connected by a conduit 13. Consequently, the chambers 11a and 12a of the cylinders 11 and 12, respectively, and the conduit 13 provide a closed hydraulic circuit.

An expansible chamber in the form of a cylinder 17 is connected to the conduit 13 through a valve 18, and slidably disposed in the cylinder 17 is a piston 20 which is engaged by a compression spring 19 which in turn is engaged by a follower 21 adjustable by an adjusting screw 22 having a finger-engaging knob 22a thereon.

The operation of the levelling mechanism of this invention will be described with reference to FIG. 2, and it will be seen that upon upward movement of the forward end of the right-hand frame 1a that the piston 12b in the cylinder 12 will also be moved upwardly, resulting in forcing fluid from the chamber 12a of the cylinder 12 through the conduit 13 into the chamber 11a of the cylinder 11. It is assumed that at this time the valve 18 is closed, and consequently the fluid transferred from the cylinder 12 to the cylinder 11 will tend to force the piston 11b downwardly against the resistance afforded by the left-hand track 14 and engagement with the ground, thereby tending to raise the left-hand side of the chassis 10 to maintain the same substantially level about a longitudinal axis. The same operation will, of course, occur upon upward movement of the left-hand track 14, the operation being the reverse of that described above. With the valve 18 closed, a substantially rigid supporting means is provided between the chassis 10 and the frames 1 and 1a, since the hydraulic fluid in the cylinders 11 and 12 is substantially incompressible, and as a result a uniform support will be provided, regardless of changes in the load on the chassis of the vehicle. As a result, if the vehicle be of the bulldozer type, raising and lowering of the ground-engaging blade will cause no relative movement between the chassis and the running gear, thereby permitting convenient adjustment of the blade with respect to the ground, and also maintaining the blade substantially level with respect to the ground by reason of the operation of the levelling mechanism as described above.

When it is desired to provide a resilient support for the chassis of the vehicle on the running gear, it is only necessary to open the valve 18 which will result in fluid from the cylinders 11 and 12 and the conduit 13 being forced into the cylinder 17 upon upward movement of the tracks of the vehicle, and the pressure exerted upon the fluid in the cylinder 17 may be adjusted by the adjusting screw 22 through the spring 19 and engagement with the piston 20. Use of the expansible chamber provided by the cylinder 17 will in no way impede the operation of the levelling mechanism, since upon equal relative movement between the right and left-hand tracks of the vehicle, fluid will be transferred between the cylinders 11 and 12 to maintain the chassis of the vehicle substantially level about a longitudinal axis, and fluid will only flow into the expansible chamber provided by the cylinder 17 upon simultaneous upward movement of the right and left-hand tracks of the vehicle.

It will be obvious that by the above-described invention there has been provided a relatively simple, yet highly effective levelling mechanism for an endless track-type vehicle, and one which may be utilized to maintain the adjustment of a bulldozer blade with respect to the ground substantially constant, regardless of the load imposed on the chassis of the vehicle, and one which may be conveniently converted to provide a resilient support for the chassis of the vehicle upon the running gear thereof.

It will be obvious to those skilled in the art that various changes may be made in the invention without departing from the spirit and scope thereof, and therefore the invention is not limited by that which is shown in the drawing and described in the specification, but only as indicated in the appended claims.

What I claim is:

1. Levelling mechanism for an endless track vehicle having a chassis and running gear comprising a pair of driven rollers mounted on an axle adjacent the rear of said chassis, frames pivotally mounted on said axle and extending forwardly on each side of said chassis, an idler roller rotatably mounted adjacent the forward end of each frame and ground-engaging tracks trained over said driven rollers and said idler rollers, said mechanism comprising a link pivotally connected to one frame forwardly of said axle, a crankshaft rotatably mounted on said chassis adjacent said one frame, a crank arm on said crankshaft pivotally connected to said link, a first cylinder pivotally mounted on said chassis, a piston in said cylinder, a second crank arm on said crankshaft pivotally connected to said piston, a second link pivotally connected to the other frame forwardly of said axle, a second crankshaft rotatably mounted on said chassis adjacent said other frame, a crank arm on said second crankshaft pivotally connected to said second link, a second cylinder pivotally mounted on said chassis, a second piston in said second cylinder, a second crank arm on said second crankshaft pivotally connected to said second piston and a conduit connecting said cylinders, said cylinders and conduit being filled with fluid, whereby upon vertical movement of the forward end of either frame with respect to the other, movement of said pistons in said cylinders will cause fluid to flow through said conduit from one cylinder to the other to maintain said chassis substantially level about the longitudinal axis.

2. Levelling mechanism as defined in claim 1, in which an expansible chamber is connected to said conduit to provide for yieldable movement of both pistons in response to simultaneous vertical movement of the forward ends of said frames.

3. Levelling mechanism as defined in claim 2, in which a valve is provided between said chamber and said conduit to render said chamber inoperative.

4. Levelling mechanism as defined in claim 2, in which said chamber comprises a cylinder and piston.

5. Levelling mechanism as defined in claim 4, in which spring means is provided for urging said last-named piston in a direction to reduce the volume of said chamber.

6. Levelling mechanism as defined in claim 5, in which said spring means is adjustable.

References Cited by the Examiner

UNITED STATES PATENTS

| 2,312,389 | 3/43 | Cordes | 37—124 |
| 2,928,486 | 3/60 | Van meter | 180—41 |
| 3,012,624 | 12/61 | Lich | 180—9.5 |
| 3,063,510 | 11/62 | Hunger | 267—15 X |

FOREIGN PATENTS

| 565,212 | 11/32 | Germany. |
| 867,359 | 2/53 | Germany. |

ARTHUR L. LA POINT, *Primary Examiner.*